(12) United States Patent
Steele, Jr.

(10) Patent No.: US 6,715,066 B1
(45) Date of Patent: Mar. 30, 2004

(54) SYSTEM AND METHOD FOR ARRANGING BITS OF A DATA WORD IN ACCORDANCE WITH A MASK

(75) Inventor: Guy L. Steele, Jr., Lexington, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/545,020

(22) Filed: Apr. 7, 2000

(51) Int. Cl.⁷ ................................. G06F 7/06

(52) U.S. Cl. ................ 712/300; 712/224; 708/209

(58) Field of Search ........................ 712/224, 300; 708/209, 210, 204, 211

(56) References Cited

U.S. PATENT DOCUMENTS

| | | | | |
|---|---|---|---|---|
| 4,085,447 A | * | 4/1978 | Pertl et al. | 712/224 |
| 5,339,447 A | * | 8/1994 | Balmer | 377/82 |
| 5,696,922 A | * | 12/1997 | Fromm | 711/5 |
| 6,144,986 A | * | 11/2000 | Silver | 709/201 |

OTHER PUBLICATIONS

Tanenbaum, Structured Computer Organization 2nd Edition, 1984, p. 11.*
Scott, "Synchronization and Communication in the T3E Multiprocessor," Cray Research, Inc., 1996, pp. 26–36.*
Hillis, W. Daniel & Steele, Guy L. Data Parallel Agorithms, *Communications of the ACM*, Dec. 1986, vol. 29, No. 12, pp.1170–1183.

* cited by examiner

Primary Examiner—Eddie Chan
Assistant Examiner—David J. Huisman
(74) Attorney, Agent, or Firm—Foley Hoag LLP (57) ABSTRACT

A system is described for rearranging data units of a data word in accordance with a mask word, the mask word having a plurality of mask bits each associated with a data unit, each mask bit having one of a set condition or a clear condition. The system includes a control module and a shifter module. The control module is configured to generate, for each mask bit, values identifying the number of mask bits to the left of the respective mask bit which have one of the set condition or the clear condition and the number of mask bits to the right of the respective mask bit which have the other of the set condition or the clear condition. The shifter module is configured to shift data units of the data word in accordance with the values generated by the control module.

43 Claims, 5 Drawing Sheets

SYSTEM AND METHOD FOR ARRANGING BITS OF A DATA WORD IN ACCORDANCE WITH A MASK

CROSS-REFERENCE TO RELATED APPLICATION

This application is related to commonly owned co-pending U.S. patent application Ser. No. 09/545,022, which was filed on Apr. 7, 2000, by Guy L. Steele Jr. for a System and Method for Unpacking and Merging Bits of a Data Word in Accordance with Bits of a Mask Word.

FIELD OF THE INVENTION

The invention relates generally to the field of digital computers and more specifically to functional units for processing predetermined types of instructions. The invention particularly provides a circuit or functional unit for use in connection with execution of an instruction for rearranging bits of a data word in accordance with a mask.

BACKGROUND OF THE INVENTION

Computers process data in accordance with instructions. One type of instruction which has been proposed is a so-called "sheep and goats" instruction which accepts as operands a data word and a mask word and rearranges the bits of the data word in accordance with the mask word. In the rearranged data word, the bits of the data word in bit positions which correspond to bits of the mask which are clear, or have the value "zero," are shifted to the "left" end of the rearranged data word with their order being preserved, and the bits of the data word in bit positions which correspond to bits of the mask which are set, or have the value "one," are shifted to the right end of the data word with their order being preserved. For example, if an eight bit data word has the value "abcdefgh" (where the letters represent binary integers having the value "one" or "zero"), and the mask word corresponds to "10011011," in the rearranged data word generated when the "sheep and goats" instruction is executed with these as operands, the bits "b," "c," and "f," all of which are in bit positions for which the mask bits are clear would be shifted to the left, preserving their order "bcf," and the bits "a," "d," "e," "g," and "h," all of which are in bit positions for which the mask bits are set would be shifted to the right, preserving their order "adegh," with the result being the rearranged data word "bcfadegh." Essentially, the "sheep and goats" instruction results in a rearrangement of bits of a data word into two groups as defined by bits of a mask word, one group (the "sheep") corresponding to those bits for which the bits of the mask word are clear, and the other (the "goats") corresponding to those bits for which the bits of the mask word are set, and in addition preserves order in each group In a variant of the "sheep and goats" instruction, the bits of the rearranged data word in bit positions for which the bits of the mask are either set or clear (but preferably not both) will be set to a predetermined value. Generally, it has been proposed that, for example, the bits of the rearranged data word in bit positions for which the bits of the mask are clear will be set to zero, but the variant may be used with either the "sheep" or the "goats," and the predetermined value may be either "one" or "zero."

A "sheep and goats" instruction can find utility in connection with, for example, performing various bit permutations, for example, using a mask consisting of alternating set and clear bits will result in a so-called "unshuffle" permutation of a data word. In addition, the variant can be useful in connection with using a set of originally discontiguous bits to perform a multi-way dispatch, or jump, by making the bits contiguous and using the result to form an index into a jump table.

SUMMARY OF THE INVENTION

The invention provides a new and improved circuit or functional unit for use in connection with execution of an instruction for rearranging bits of a data word in accordance with a mask. In brief summary, the invention provides a system for rearranging data units of a data word in accordance with a mask word, the mask word having a plurality of mask bits each associated with a data unit, each mask bit having one of a set condition or a clear condition. The system includes a control module and a shifter module. The control module is configured to generate, for each mask bit, values identifying the number of mask bits to the left of the respective mask bit which have one of the set condition or the clear condition and the number of mask bits to the right of the respective mask bit which have the other of the set condition or the clear condition. The shifter module is configured to shift data units of the data word in accordance with the values generated by the control module.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1A:
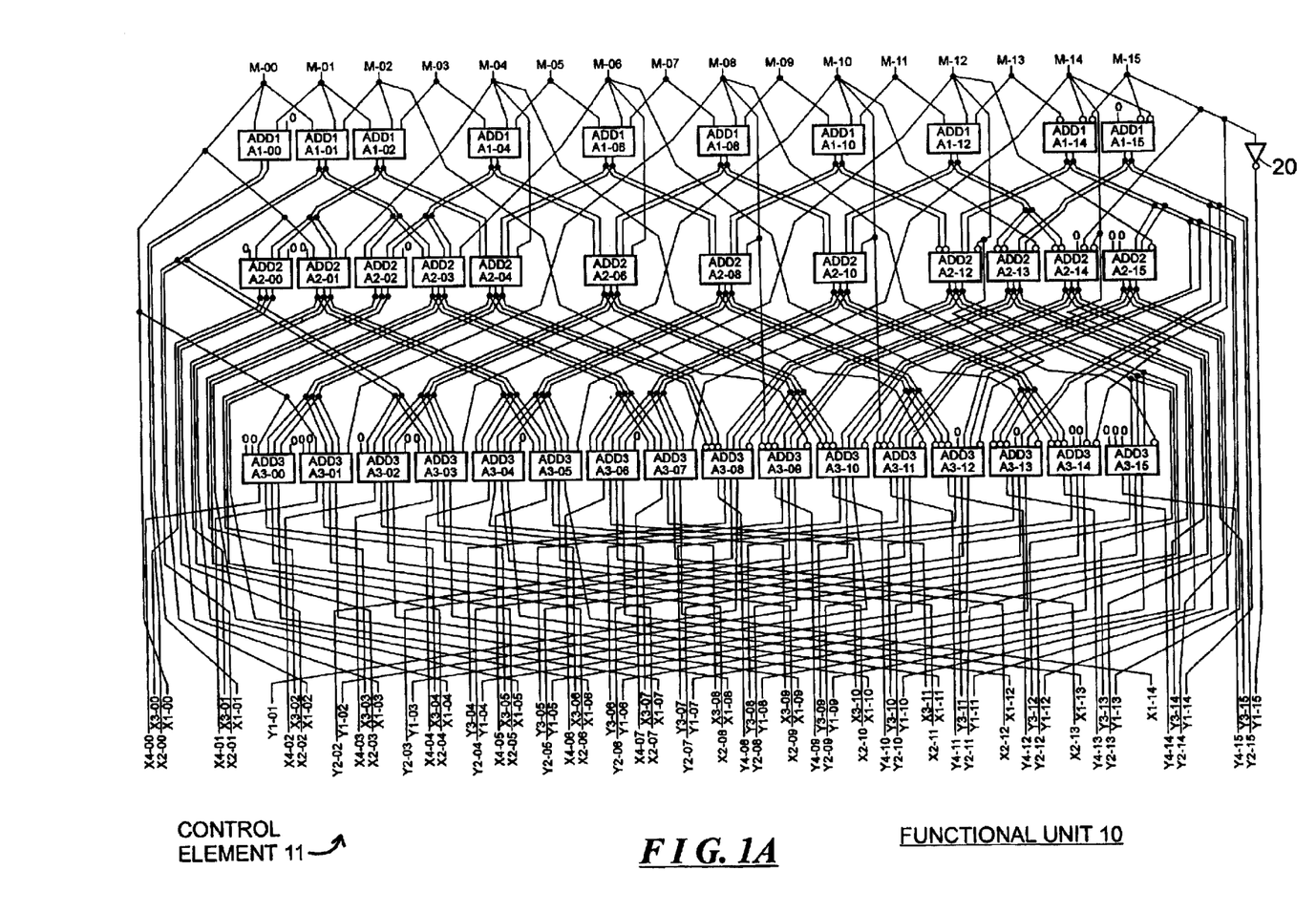
FIGS. 1A and 1B together depict a functional block diagram of a circuit or functional unit for use in connection with execution of an instruction for rearranging bits of a data word in accordance with a mask, in accordance with the invention.
Figure 1B:
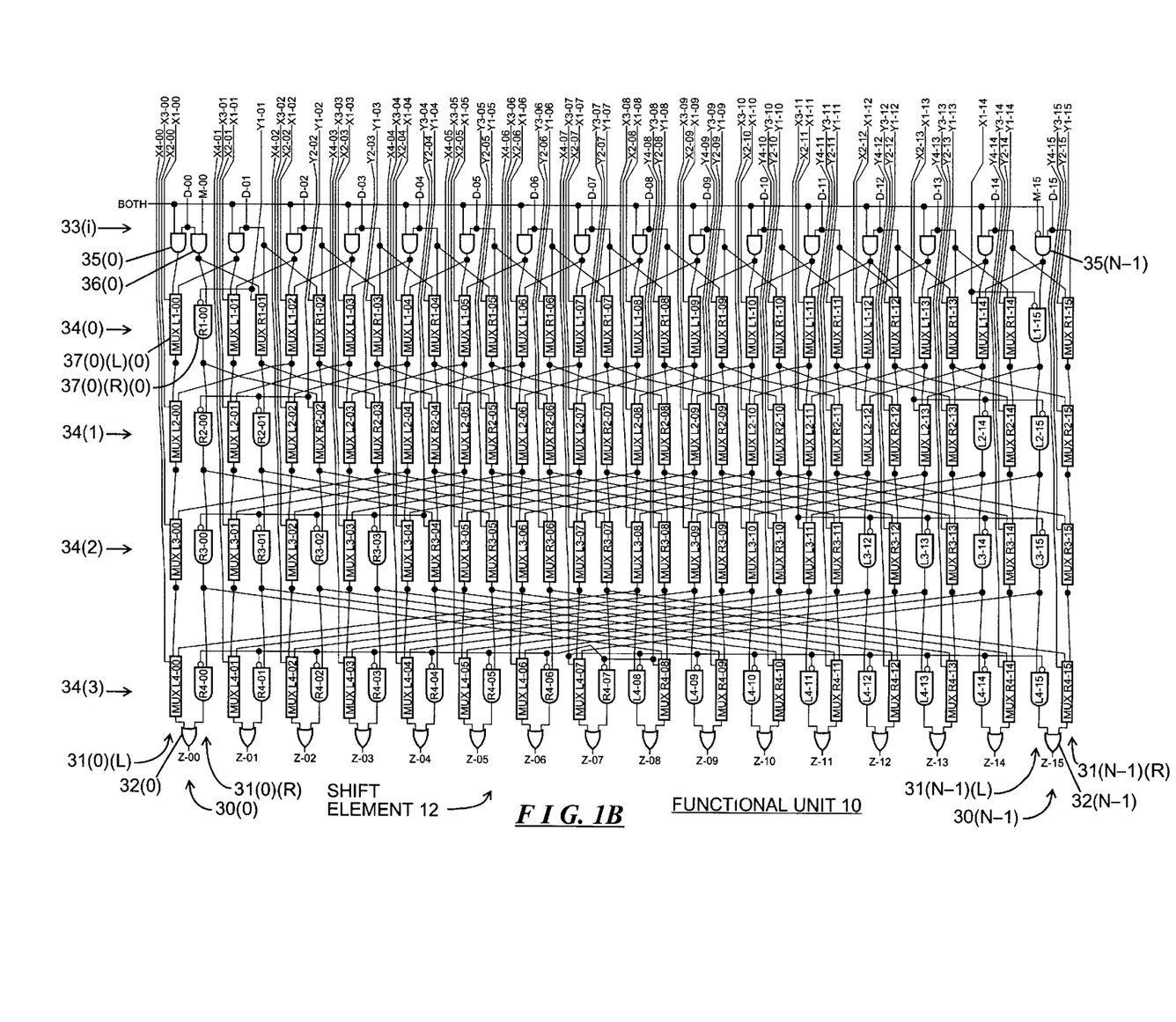

FIGS. 1A and 1B together depict a functional block diagram of a circuit or functional unit 10 for use in connection with execution of an instruction for rearranging bits of a data word in accordance with a mask, in accordance with the invention. The functional unit generally comprises two elements, including a control element 11, depicted on to FIG. 1A, and a shift element 12, depicted on FIG. 1B. The control element 11 identifies, for each bit position $D_0$ through $D_{N-1}$ (generally $D_n$) in the data word, the number of bits in bit positions $M_0, \ldots, M_{n-1}$ in the mask to the left of that bit position which are set, or have the value "one," and in addition the number of bits in bit positions $M_{n-1}, \ldots, M_{N-1}$ in the mask to the right of that bit position which are clear, or have the value "zero." The information generated by the control element 12 is expressed in control signals which control the shift element 12, which, in turn, shifts the bits of the data word from each of the bit positions into the correct bit position of the rearranged data word. It will be appreciated, except in the cases of the mask bit in-bit position $M_0$, if that bit is set (one), and the mask bit in bit position $M_{N-1}$, if that bit is clear (zero), that the information generated by the control element 11 is sufficient to control the shifting of the bit in each bit position $D_n$. This follows since, for any bit position $M_n$ in the mask word, the control element 11 determines for the bit in bit position $M_{n+1}$ of the mask that the number of bits to the left of that bit position which are set is greater than the number that it determines for bit position $M_n$, then the bit in bit position $M_n$ of the mask must be set (one). Similarly, if the control element 11 determines for the bit in bit position $M_{n-1}$ of the mask that the number of bits in bit positions to the right of that bit position which are clear is greater than the number that it determines for bit position $M_n$, then the bit in bit position $M_n$ must be clear (zero).

The functional unit 10 specifically depicted in FIGS. 1A and 1B is for use with data words and masks, having sixteen bit positions $D_0$ through $D_{15}$ (generally $D_n$) and $M_0$ through $M_{15}$ (generally $M_n$) respectively, but it will be appreciated that the number "N" of bit positions may comprise any convenient number.

Generally, the control element 11 generates, for each bit $D_n$ of the data word, a value identifying the number of mask bits $M_0$ through $M_{n-1}$ to the left of mask bit $M_n$ which are set (that is, which have the value 1), and a value identifying the number of mask bits $M_{n+1}$ through $M_{15}$ to the right of mask bit $M_n$ which are clear (that is, which have the value 0). It will be appreciated that, if the mask bit $M_n$ corresponding to the bit $D_n$ is clear, the data bit $D_n$ will need to be shifted to the left by a number of bit positions corresponding to the number of mask bits $M_0$ through $M_{n-1}$ which are set, and, if the mask bit $M_n$ is set, the data bit $D_n$ will need to be shifted to the right by a number of bit positions corresponding to the number of mask bits $M_{n+1}$ through $M_{15}$ which are clear.

With reference to FIG. 1A, the control element 11 depicted therein comprises a plurality of adders arranged in three stages, with (i) adders in the first stage being identified by reference numerals A1-00 through A1-02, A1-04, A1-06, A1-08, A1-10, A1-12, A1-14 and A1-15

(ii) adders in the second stage being identified by reference numerals A2-00 through A2-04, A2-06, A2-08, A2-10 and A2-12 through A2-15, an (iii) adders in the third stage being identified by reference numerals A3-00 through A3-15.

In the first stage, each adder A1-n (where "n" ranges over 1, 2, 4, 6, 8, 10 and 12) receives the mask bit from bit positions $M_{n-1}$, $M_n$ and $M_{n-1}$ (if any) and generates a value identifying the number of bits in those bit positions which are set (one). Accordingly, it will be appreciated that each adder A1-n effectively identifies the number of bits in the three bit positions (if any) to the left of bit position $M_{n+2}$ in the mask which are set (one). It will be appreciated that the adder A1-00 only identifies the number of bits in the two bit positions to the left of bit position $M_2$ which are set (one). In addition, the mask bit in bit position $M_0$ itself identifies the number of bits in the one bit position to the left of bit position $M_1$ which is set, and there are no bits to the left of bit position $M_0$.

On the other hand, adders A1-15 and A1-14 identify the number of bits in the three bit positions to the right of bit positions $M_{13}$ and $M_{12}$, respectively, which are clear (zero). In particular each adder A1-n (where "n" equals 15 or 14) receives the mask bits from bit positions $M_{n+1}$, $M_n$ and $M_{n-1}$ (if any), complements them and generates a value identifying the number of bits in those bit positions which are clear (zero). Accordingly, it will be appreciated that each adder A1-n effectively identifies the number of bits in the three bit positions (if any) to the right of bit position $M_{n-2}$ which are clear (zero). It will be appreciated that adder A1-15 only identifies the number of bits in the two bit positions to the right of bit position $M_{13}$ which are clear (zero). In addition, the complement, generated by an inverter 20, of the mask bit in bit position $M_{15}$ itself identifies the number of bits in the one bit position to the right of bit position $M_{14}$ which are clear, and there are bits to the right of bit position $M_{15}$.

In the second stage, each adder A2-n (where "n" ranges from 0 through 4, 6, 8 and 10) receives selected ones of the values generated by adders A1-00 through A1-02, A1-04, A1-06, A1-08, A1-10 and A1-12, and selected ones of the mask bits in bit positions $M_0$, $M_4$, $M_6$, $M_8$, $M_{10}$ and $M_{12}$, and generates a value identifying the number of bits in a series of seven bit positions are set (one). In particular, for example, adder A2-00 receives the value generated by adder A1-02, and the mask bit in bit position $M_0$. As described above, adder A1-02 generates a value that identifies the number of mask bits in bit positions $M_1$ through $M_3$ which are set (one). In addition, the mask bit in bit position $M_0$ itself serves to indicates whether the mask bit in bit position $M_0$ is set, and, accordingly, the value generated by adder A2-00 identifies the number of mask bits to the left of bit position $M_4$ which are set (one). Similarly, adders A2-01 through A2-03 generate respective values that identify the number of mask bits to the left of bit positions $M_5$ through $M_7$ which are set, and adders A2-04, A2-06, A2-08 and A2-10 generate respective values that identify the number of set bits in overlapping sequences of bit positions $M_1$ $M_7$, $M_3$ $M_9$, $M_5$ $M_{11}$, and $M_7$ $M_{13}$, thereby identifying the number of bits in each seven-bit sequence to the left of bit positions $M_8$, $M_{10}$, $M_{12}$ and $M_{14}$, which are set (one).

On the other hand, in the second stage, each adder A2-n (where "n" ranges from 12 through 15), receives selected ones of the values generated by adders A1-14 and A1-15, the complements of the values generated by the adders A1-10 and A1-12, and the complements of the mask bits from bit positions $M_{10}$ and $M_{12}$. It will be appreciated that, since the values generated by adders A1-10 and A1-12 identify the number of mask bits in bit positions $M_9$ through $M_{11}$ and $M_{11}$ through $M_{13}$, respectively, which are set, the complements of the values generated by adders A1-10 and A1-12 effectively identify the number of mask bits in those bit positions which are clear. Accordingly, the adders A2-12 through A2-15 generate values identifying the number of mask bits to the right of bit positions $M_8$, $M_9$, $M_{10}$ and $M_{11}$, respectively, which are clear (zero).

In the third stage, each adder A3-n (where "n" ranges from 00 through 07) receives selected ones of the values generated by adders A1-01, A2-04, A2-06, A2-08, and A2-10, and selected ones of the mask bits in bit positions $M_0$, $M_8$, $M_{10}$, $M_{12}$ and $M_{14}$, and generates respective values that identify the number of bits to the left of respective bit positions $M_8$ through $M_{15}$ which are set (one). For example, adder A3-00 receives the value generated by adder A2-04 and the mask bit in bit position $M_0$. As noted above, the value generated by adder A2-04 identifies the number of bits in bit positions $M_1$ through $M_7$ which are set, and adding that value to the mask bit in bit position $M_0$ indicates the number of bits in bit positions $M_0$ through $M_7$ which are set. Thus, the value generated by adder A2-04 identifies the number of bits in bit positions to the left of bit position $M_8$ which are set. Similarly, adder A3-01 receives the value generated by the adder A2-04 and the mask bits in bit positions $M_0$ and $M_8$, and generates a value that identifies the number of bits in bit positions $M_0$ and $M_8$ which are set, which in turn, corresponds to the number of bits to the left of bit position $M_9$ which are set. Adder A3-02 receives the value generated by adders A1-01 and A2-06. As noted above, the adder A1-01 generates a value that identifies the number of bits in bit positions $M_0$ through $M_3$ which are set, and adder A2-06 generates a value that identifies the number of bits in bit positions $M_4$ through $M_9$ which are set. Accordingly, the value generated by adder A3-02 identifies the number of bits in bit positions $M_0$ through $M_9$ which are set, which, in turn, corresponds to the number of bits in bit positions to the left of bit position $M_{10}$ which are set. That the other adders A3-03 through A3-07 generate values that identify the number of bits to the left of respective bit positions $M_{11}$ through $M_{15}$ which are set, will be apparent to those skilled in the art.

Similarly, each adder A3-n (where "n" ranges from 08 through 15) receives and complements selected ones of the values generated by adders A2-04, A2-06, A2-08 and A2-10 and selected ones of the mask bits in bit positions $M_2$, $M_4$, $M_6$, $M_8$, $M_{10}$, and $M_{12}$, $M_{14}$, and $M_{15}$, and further receives (without complementing) selected ones of the values generated by adders A2-12 through A2-15, A1-14 and A1-15, and generates respective values that identify the number of bits to the right of respective bit positions $M_0$ through $M_7$ which are clear (zero). For example, adder A3-15 receives the value generated by adder A2-12, and receives and complements the mask bit in bit position $M_8$. As noted above, the value generated by adder A2-12 identifies the number of mask bits in bit positions $M_9$ through $M_{15}$ which are clear, and adding that value to the complement of the mask bit in bit position $M_8$ identifies the number of mask bits in bit positions $M_8$ through $M_{15}$ which are clear, which, in turn, corresponds to the number of bits to the right of bit position $M_7$ which are clear. Similarly, adder A3-14 receives and complements the value generated by adder A2-10 and the mask bits in bit positions $M_{14}$ and $M_{15}$. Since the adder A2-10 generates a value which identifies the number of bits in bit positions $M_7$ through $M_{13}$ which are set, the complement of the value generated by adder A2-10 identifies the number of bits in bit positions $M_7$ through $M_{13}$ which are clear. Similarly, the complements of the mask bits in bit positions $M_{14}$ and $M_{15}$ identify whether those mask bits are clear, and so the sum of the complements of the value generated by adder A2-10 and the mask bits in bit positions $M_{14}$ and $M_{15}$ identifies the number of bits in bit positions $M_7$ through $M_{15}$ which are clear, which, in turn identifies the number of mask bits to the right of bit position $M_6$ which are clear. That the other adders A3-08 through A3-13 generate values that identify the number of mask bits to the right of respective bit positions $M_0$ through $M_5$ which are clear, will be apparent to those skilled in the art.

In general, the control circuit 11,
(i) in identifying the number of bits to the left of respective bit positions which are set,
  (a) the mask bit in the leftmost bit position $M_0$ identifies the number of bits to the left of the second leftmost bit position $M_1$ which are set, and
  (b) in each stage, the leftmost $2^j$ (where "j" identifies the stage 1, 2 or 3) adders identify the number of bits to the left of respective bit positions which are set, with the adders in successive stages identifying the number of bits to the left of successive ones of the bit positions which are set; that is, the leftmost two adders in the first stage identifying the number of bits to the left of bit positions $M_2$ and $M_3$ which are set, the leftmost four adders in the second stage identifying the number of bits to the left of bit positions $M_4$ through $M_7$ which are set, and the leftmost eight adders in the third stage identifying the number of bits to the left of bit positions $M_8$ through $M_{15}$ which are set; similarly, (ii) in identifying the number of bits to the right of respective bit positions which are clear,
  (a) the complement of the mask bit in the rightmost bit position $M_{15}$ identifies the number of bits to the right of the second rightmost bit position which are clear, and
  (b) in each stage, the rightmost $2^j$ (where "j" identifies the stage 1, 2 or 3) adders identify the number of bits to the right of respective bit positions which are clear, with the adders in successive stages identifying the number of bits to the right of successive ones of the bit positions which are clear; that is, the rightmost two adders in the first stage identifying the number of bits to the right of bit positions $M_{13}$ and $M_{12}$ which are clear, the rightmost four adders in the second stage identifying the number of bits to the right of bit positions $M_{11}$ through $M_8$ which are clear, and the rightmost eight adders in the third stage identifying the number of bits to the right of bit positions $M_7$ through $M_0$ which are clear.

The other adders in the respective stages generate values which are used by the adders in the subsequent stages to generate the values as indicated above.

As noted above, the control element 11 generates control signals which are used by the shift element 12 to shift the bits $D_n$ of the data word into the correct bit positions as determined by the bits $M_n$ of the mask word. The control signals comprise a signal representative of the state of the $M_0$ bit of the mask word, and the outputs of adders A1-00, A1-01, A2-00 through A2-03, and A3-00 through A3-07, which, above, respectively identify the number of bits of the mask word to the left of respective bit positions $M_1$ through $M_{15}$ which are set, and a signal representative of the complement of the $M_{15}$ bit of the mask word, and the outputs of adders A1-15, A1-14, A2-15 through A2-12, and A3-15 through A3-08, which, as noted above, respectively identify the number of bits of the mask word to the right of respective bit positions which are clear. The output of each adder comprises a plurality of signals (two each for adders A1-00, A1-01, A1-14 and A1-15, three each for adders A2-00 through A2-04 and A2-12 through A2-15 and four each for adders A3-00 through A3-15), which represent a binary-encoded value, which signals are permuted into sixteen sets of control signals X4-00, X3-00, X2-00 and X1-00 (which together will be referred to as set S0) through Y4-15, Y3-15, Y2-15 and Y1-15 (which together will be referred to as set S15). Before describing the manner in which the outputs of the adders and the signals representative of the states of the $M_0$ and complement of the $M_{15}$ bits of the mask word are permuted into the various sets of control signals, it would be helpful to describe the shift element 12 as depicted in FIG. 1B.

With reference to FIG. 1B, the shift element 12 comprises sixteen columns 30(0) through 30(15) (generally identified by reference numeral 30(n)), each of which receives one of the bits $D_n$ of the data word and provides one of the shifted bits $Z_n$ of the rearranged data word. Each column 30(n) consists of two series of shift elements, one of which, identified as left shift series 31(n)(L), is used to control shifting to the left, and the other, identified as right shift series 31(n)(R), is used to control shifting to the right. For example, left shift series 31(0)(L) comprises multiplexers MUX L1-00. MUX L2-00, MUX L3-00, and MUX L4-00, while right shift series 31(0)(R) comprises gates R1-00, R2-00, R3-00, and R4-00. Similarly. left shift series 3l(N−1)(L) comprises gates L1-15, L2-15, L3-15, and L4-15, while right shift series 31(N−1)(R) comprises multiplexers MUX R1-15, MUX R2-15, MUX R3-15, and MUX R4-15. If a bit $D_n$ of the data word is not to be shifted, the bit $D_n$ sequences through either the left shift series $31(n)(L)$ or the right shift series $31(n)(R)$ of the respective column $30(n)$. Essentially, the shift element 12 comprises two shifters, including the right shift series and left shift series, with each column $30(n)$ including a respective OR gate $32(n)$ to provide a single output signal $Z_n$ therefor.

Within the shift element 12, each column $30(n)$ further comprises a series of shift control elements which facilitate the shifting of a data bit $D_n$ into the column from the right (in the case of the left shift series $31(n)(L)$), or the left (in the case of the right shift series $31(n)(R)$) in a series of stages, including an input stage $33(i)$ and a series of four shift stages $34(0)$ through $34(3)$ (generally $34(s)$). The input stage distributes each data bit $D_n$ to the input of the left shift series $31(n-1)(L)$ in the preceding column $30(n-1)$ (if one exists and if a BOTH signal is asserted), the inputs of both the left and right shift series $31(n)(L)$ and $31(n)(R)$ in the corresponding column $31(n)$, and the input of the right shift series $31(n+1)(R)$ in the next column $30(n+1)$ (if one exists). The BOTH signal is provided to control shifting of the data bits $D_n$ if those associated with both those mask bits $M_n$ which are clear and those associated with mask bits $M_n$ which are set are to be shifted. In that case, the BOTH signal is asserted, allowing data bits to be shifted both to the left and to the right. On the other hand, if only data bits which are associated with mask bits $M_n$ which are set are to be shifted, the BOTH signal will be negated, which essentially blocks coupling of signals associated with the data bits $D_n$ to the left shift series $31(n)(L)$ of all of the columns $30(n)$, thereby insuring that all of the data bits which are associated with mask bits $M_n$ which are clear, and therefore to be shifted to the left, are set to zero. An AND gate $35(n)$ is provided for each column $30(n)$ which controls the coupling of each data bit $D_n$ to the left shift series $31(n)(L)$ in each column. If the BOTH signal is asserted, the AND gates $35(n)$ couple the data bits $D_n$ to the left shift series $31(n-1)(L)$ and $31(n)(L)$ of both the preceding and corresponding columns $30(n-1)$ and $30(n)$. On the other hand, if the BOTH signal is negated, the AND gates $35(n)$ block the data bits $D_n$ from being coupled to the left shift series $31(n-1)(L)$ and $31(n)(L)$ of both the preceding and corresponding columns $30(n-1)$ and $30(n)$, and instead provide signals to those left shift series corresponding to the value "zero."

The operation of the shift control elements in the respective shift stages $34(s)$ will be essentially similar regardless of the condition of the BOTH signal. Accordingly, in the following, it will be assumed that the BOTH signal is asserted, and that data bits $D_n$ are to be shifted from the left end of the data word to respective output bit positions $Z_n$ which are associated with bit positions of the mask word for which mask bits $M_n$ are clear. As noted above, if the BOTH signal is asserted, the input stage $33(i)$ in each column $30(n)$ distributes each data bit $D_n$ to the input of the left shift series $31(n-1)(L)$ in the preceding column (if one exists), the inputs of both the left and right shift series $31(n)(L)$ and $31(n)(R)$ in the corresponding column $31(n)$, and the input of the right shift series $31(n+1)(R)$ in the next column $31(n)$ (if one exists). For column $30(0)$, which receives the data bit $D_0$, the input stage $33(i)$ is further provided with an AND gate $36(0)$ which controls the distribution of the data bit $D_0$ to the right shift series $31(0)(R)$ and $31(1)(R)$ of columns $30(0)$ and $30(1)$. Inparticular, if the mask bit $M_0$ is set, indicating that the data bit $D_0$ is to be shifted to the right, or, if all of the mask bits $M_n$ are is set, to remain in the same column in the rearranged data word, the AND gate $36(0)$ enables the data bit $D_0$ to be distributed to the right shift series $31(0)(R)$ and $31(1)(R)$ of columns $30(0)$ and $31(1)$. On the other hand, if the mask bit $M_0$ is clear, indicating that the data bit $D_0$ is not to be shifted to the right, the AND gate $36(0)$ blocks the data bit $D_0$ from being distributed to the right shift series $31(0)(R)$ and $31(1)(R)$ of columns $30(0)$ and $31(1)$.

Similarly, for column $30(15)$, which receives the data bit $D_{15}$, the input stage $33(i)$ is provided with an AND NOT gate $36(15)$ which controls the distribution of the data bit $D_{15}$ to the left shift series $31(15)(L)$ and $31(14)(L)$ of columns $30(15)$ and $30(14)$. An AND NOT gate receives two input signals, complements one of them and generates an output signal which corresponds to the logical AND of the uncomplemented and complemented input signals. In particular, if the mask bit $M_{15}$ is clear, indicating that the data bit $D_0$ is to be shifted to the left, or, if all of the mask bits $M_n$ are clear, to remain in the same column in the rearranged data word, the AND gate $36(15)$ enables the data bit $D_{15}$ to be distributed to the left shift series $31(15)(L)$ and $31(14)(L)$ of columns $30(15)$ and $31(14)$. On the other hand, if the mask bit $M_{15}$ is set, indicating that the data bit $D_{15}$ is not to be shifted to the left, the AND gate $36(15)$ blocks the data bit $D_{15}$ from being distributed to the left shift series $31(15)(L)$ and $31(14)(L)$ of columns $30(15)$ and $31(14)$. AND gates $36(0)$ and $36(15)$ are provided to accommodate the fact, as noted above, that the information provided by control element 12 is not sufficient to control the shifting of data bit $D_0$ to the right and data bit $D_{15}$ to the left.

Each of the shift control elements in the shift stages $34(s)$ of the respective left and right shift series $31(n)(L)$ and $31(n)(R)$, which will be identified by reference numerals $37(n)(L)(s)$ and $37(n)(R)(s)$, comprises either a multiplexer or an AND NOT gate. If the shift control element $37(n)(L)(s)$ in a left shift series $31(n)(L)$ is a multiplexer, the multiplexer receives signals from two columns $30(n)$ and $30(n')$ in the input stage $33(i)$ (in the case of a shift control element in shift stage $34(0)$) or two columns $30(n)$ and $30(n')$ in the preceding stage $34(s-1)$ (in the case of a shift control element in the shift stages $34(1)$ through $34(3)$) and selectively couples one of the signals to two columns $30(n)$ and $30(n'')$ in the next shift stage $34(s+1)$ (in the case of shift stages $34(0)$ through $34(3)$) or to the respective OR gate $32(n)$ (in the case of left shift control element $37(n)(L)(4)$ in the last shift stage $34(3)$). In particular, a multiplexer comprising a shift control element $37(n)(L)(s)$ in a shift stage $34(s)$ receives the signals from the corresponding column $30(n)$ and from a column $30(n')$ to the right of column $30(n)$, where the displacement $n'-n$ corresponds to $2^s$, thereby to effect a left shift of the data bit from the column $30(n')$ into the column $30(n)$ of distance $2^s$. Similarly, each multiplexer in stages $34(0)$ through $34(2)$ couples the selected one of the input signals to the shift control elements $37(n)(L)(s+1)$ and $37(n'')(L)(s+1)$ in columns $30(n)$ and $30(n'')$ of the next shift stage $34(s+1)$, where the displacement $n''-n$ corresponds to $2^{s+1}$, thereby to effect a left shift of the data bit from column $30(n)$ to the column $30(n'')$ of distance $2^{s+1}$.

Similarly, if the shift control element in a right shift series $31(n)(R)$ is a multiplexer, the multiplexer receives signals from two columns $30(n)$ and $30(n')$ in the input stage $33(i)$ (in the case of a shift control element in shift stage $34(0)$) or two columns $30(n)$ and $30(n')$ in the preceding stage $34(s-1)$ (in the case of a shift control element in the shift stages $34(1)$ through $34(3)$) and selectively couples one of the signals to the next shift stage $34(s+1)$ (in the case of shift stages $34(0)$ through $34(3)$) or to the respective OR gate $32(n)$ (in the case of a right shift control element $37(n)(R)(4)$ in the last shift stage 34(3)). In particular, a multiplexer comprising a shift control element 37(n)(R)(s) in a shift stage 34(s) receives the signals from the corresponding column 30(n) and from a column 30(n') to the left of column 30(n), where the displacement n-n' corresponds to $2^s$, thereby to effect a right shift of the data bit from column 30(n) to the column 30(n') of distance $2^s$. Similarly, each multiplexer in stages 34(0) through 34(2) couples the selected one of the input signals to the shift control elements 37(n)(R)(s+1) and 37(n")(R)(s+1) of the next shift stage 34(s+1), where the displacement n-n" corresponds to $2^{s+1}$, thereby to effect aright shift of the databit from column 30(n) to the column 30(n") of distance $2^{s+1}$.

The left and right shift control elements in a shift stage 34(s) may be conditioned to couple a single data bit $D_n$ into both the left and right shift series of two or three columns 30(n), 30(n') and 30(n"). The AND NOT gates are provided as right and left shift control elements 37(n)(R)(s) and 37(n)(L)(s) in shift stages 34(s) of selected columns 30(n) to block further progression of data bits therethrough if a data bit is to be shifted into the respective column 30(n) from the right (thereby to effect a left shift) and left (thereby to effect a right shift), respectively. Thus, for example, in shift stage 34(0) an AND NOT gate is provided as right shift control element 37(0)(R)(0) to block data bit $D_0$ if data bit $D_1$ is to be shifted to the left into the column 30(0). In that case, the multiplexer comprising left shift element 37(0)(L)(0) will be conditioned by control signal X1-00 to couple data bit $D_1$ into the column 30(0), thereby to effect a left shift of that data bit $D_1$, and the control signal Y1-01 will be asserted, thereby to disable the AND NOT gate comprising right shift control element 37(0)(R)(0) from coupling data bit $D_0$ to the next shift stage 34(1) of the column 30(0). In addition, the control signal Y1-01 enables the multiplexer comprising the right shift control element 37(1)(R)(0) of shift stage 34(0) of column 30(1) to couple the data bit $D_0$ to the next shift stage 34(1) of column 30(1). Similarly with the other AND NOT gates. It will be appreciated that, since the AND NOT gates are provided as right shift control elements 37(n)(R)(s) in the first $2^s$ columns 30(n) in the respective stage 34(s), and as left shift control elements 37(n)(L)(s) in the last $2^s$ columns 30(n) in the respective stage 34(s), the shift element 12 accommodates all combinations of set and clear mask bits, so that each OR gate 32(n) receives a data bit from only one of the left or right shift series in each column 30(n).

Returning to FIG. 1A, as noted above, the control element 11 generates, for each bit $D_n$ of the data word, a value identifying the number of mask bits $M_0$ through $M_{n-1}$ to the left of mask bit $M_n$ which are set (that is, which have the value 1), and a value identifying the number of mask bits $M_{n+1}$ through $M_{15}$ to the right of mask bit $M_n$ which are clear (that is, which have the value 0). These values are expressed as the outputs of the signal representative of the state of the $M_0$ bit of the mask word, and the outputs of adders A1-00, A1-01, A2-00 through A2-03, A3-00 through A3-15, A2-15 through A2-12, A1-15 and A1-14, and the signal representative of the complement of the $M_{15}$ bit of the mask word. From these signals, the control element provides sixteen sets of control signals X4-00, X3-00, X2-00 and X1-00 (which together will be referred to as set S0) through Y4-15, Y3-15, Y2-15 and Y1-15 (which together will be referred to as set S15), which are used to control the multiplexers and AND NOT gates comprising the left and right shift control elements 37(n)(L)(s) and 37(n)(R)(s) of the columns 30(n) of the shift element 15. As further noted above, if the mask bit $M_n$ corresponding to the bit $D_n$ is clear, the data bit $D_n$ will need to be shifted to the left by a number of bit positions corresponding to the number of mask bits $M_0$ through $M_{n-1}$ which are set, and, if the mask bit $M_n$ is set, the data bit $D_n$ will need to be shifted to the right by a number of bit positions corresponding to the number of mask bits $M_{+1}$ through $M_{15}$ which are clear. And further, as described above in connection with FIG. 1B, the shift element 12 shifts the data bits $D_n$ in a series of stages, with the shift among the columns being in increasing powers of two. However, when a data bit $D_n$ is shifted out of its column "$n_0$," to a column "$n_1$" in the first shift stage 34(s) based on the low-order control signal associated with the remaining shift control signals provided by the control element for that data bit will also need to be shifted by the same amount. It will be appreciated that, in the first stage s=0, the amount of shift is at most one, or $2^0$, column. More generally, when a data bit $D_n$ is shifted in any stage "s" (s=0, 1, 2 or 3) from one column nk to another $n_{k'}$, the number of columns k'-k by which the data bit will be shifted in that stage will be either zero or $\pm 2^s$, that is, $+2^s$ for a rightward shift or $-2^s$ for a leftward shift. In addition, the control signals generated by the control element 11 which control the successive stages will be shifted by the same amount.

More particularly, as noted above, the mask bit in bit position $M_0$ of the mask word identifies the number of bits to the left of bit position $M_1$ which are set. If that bit is set, as described above, the shift element 12 is conditioned to shift the data bit in bit position $D_1$ to the left into the shift column 30(0). Similarly, adder A1-00 generates a value which identifies the number of bits of the mask word to the left of bit position $M_2$ which are set. That value is represented by two binary signals X1-01 and X2-00, with the X1-01 signal representing the low-order digit in the binary representation of the value, and the X2-00 signal representing the high-order digit in the binary representation of the value. Thus, the X1-01 signal controls the first shift stage 34(0) in the shift column 30(1) of the shift element 12, and the X2-00 signal is shifted to control the second shift stage 34(1) the shift column 30(0), since the signals are used to control leftward shift. In addition, adder A1-01 generates a value which identifies the number of bits of the mask word to the left of bit position $M_3$ which are set. That value is represented by two binary signals X1-02 and X2-01, with the X1-02 signal representing the low-order digit in the binary representation of the value and the X2-01 signal representing the high-order digit in the binary representation of the value. Thus, the X1-02 signal controls the first shift stage 34(0) in the shift column 30(2) of the shift element 12, and the X2-01 signal is shifted to control the second shift stage 34(1) of the shift column 30(1), since the signals are used to control leftward shift of the bit in the bit position $D_3$ of the data word.

Continuing further, the adder A2-00 generates a value which identifies the number of bits of the mask word to the left of bit position $M_4$ which are set. The value is represented by three binary signals X1-03, X2-02 and X3-00, with the X1-03 signal representing the low-order digit in the value, the X2-02 signal representing the intermediate-order digit in the value, and the X3-00 signal representing the high-order digit in the value. Thus, the low-order X1-03 signal controls the first shift stage 34(0) in the shift column 30(3) of the shift element 12, the intermediate-order X2-02 signal controls the second shift stage 34(1) in the shift column 30(2) of the shift element 12, and the high-order X3-01 signal controls the third shift stage 34(2) of the shift column 30(0), since the signals are used to control leftward shift of the bit in the bit position $D_4$ of the data word. It will be appreciated that these displacements of one, two and four columns, to the left of column 30(4), for signals representing successively higher-order digits in the binary representation of the value generated by adder A2-00, represent successive displacements of $-2^s$ where s=0, 1 and 2, respectively, of the columns 30(n) at which the respective signals are to be applied. It will further be appreciated that the signals generated by the other adders A2-01 through A2-03, which respectively identify the number of bits to the left of respective bit positions $M_5$ through $M_7$ in the mask word which are set, are similarly distributed among the first through third shift stages 34(0) through 34(2) of respective columns 30(4), 30(3) and 30(1) (in the case of bit position $M_5$) through 30(6), 30(5) and 30(3) (in the case of bit position $M_7$).

Continuing further, the adder A3-00 generates a value which identifies the number of bits of the mask word to the left of bit position $M_8$ which are set. The value is represented by four binary signals X1-07, X2-06, X3-04 and X4-00, in reverse order of the digits that they represent in the value generated by the adder A3-00. The low-order X1-07 signal controls the first shift stage 34(0) in the shift column 30(7) of the shift element 12, the X2-06 signal controls the second shift stage 34(1) in the shift column 30(6), the X3-04 signal controls the third shift stage 34(2) in shift column 30(4) and the X4-00 signal controls the fourth shift stage 34(3) in shift column 30(0), since the signals are used to control leftward shift of the bit in the bit position $D_8$ of the data word. It will be appreciated that these displacements of one, two, four and eight columns, respectively, for signals representing successively higher-order digits in the binary representation of the value generated by adder A3-00, represent successive displacements of $-2^s$, where s=0, 1, 2, and 3, respectively, of the columns at which the respective signals are to be applied. It will further be appreciated that the signals generated by the other adders A3-01 through A3-07, which respectively identify the number of bits to the left of respective bit positions $M_9$ through $M_{15}$ which are set, are similarly distributed among the first through fourth stages 34(0) through 34(3) of respective columns 30(8), 30(7), 30(5) 30(1) (in the case of bit position $M_9$) through 30(14), 30(13), 30(11) and 30(7) (in the case of bit position $M_{15}$).

The signals provided by the inverter 20 and generated by adders A1-15, A1-14, A2-15 through A2-12 and A3-15 through A3-08, which, as noted above, respectively identify the number of bits in bit positions to the right of bit positions $M_{14}$ through $M_0$ of the mask word which are clear, are distributed among the stages 34(s) of respective columns 30(n) in a manner similar to that described above, except that the successive displacements are $+2^s$ instead of $-2^s$.

A specific example will serve to illustrate the operation of the functional unit 10. In this example, the mask word is "0 1 1 0 0 0 0 1 0 1 0 0 1 0 1 0" and the data word will be "a b c d e f g h i j k l m n o p," where each letter in the data word represents a binary digit. It will be apparent that, with such a mask word, the rearranged data word is expected to be "a d e f g i k l n p b c h j m o." In that case, the values generated by the adders are:

From (1), the values which identify the number of bits of the mask word to the left of the respective bit positions $M_1$ through $M_{15}$ which are set comprise:

| | | | | | | | | |
|---|---|---|---|---|---|---|---|---|
| 0 | | | | | | | | (2) |
| 1 | 2 | | | | | | | |
| 2 | 2 | 2 | 2 | | | | | |
| 3 | 3 | 4 | 4 | 4 | 5 | 5 | 6 | | which, if laid out in a line corresponding to the bit positions $M_1$ through $M_{15}$ for which they represent counts, provides:

$$-\ 0\ 1\ 2\ 2\ 2\ 2\ 2\ 3\ 3\ 4\ 4\ 4\ 5\ 5\ 6 \quad (3)$$

(where the dash "-" indicates that no count is provided for bit position $M_0$) which, in turn, comprise the shift values for the left shift series 30(n)(L) of the respective shift columns 30(n).

Similarly, from (1), the values which identify the number of bits of the mask word to the right of the respective bit positions $M_{14}$ through $M_0$ which are clear comprise:

| | | | | | | | | |
|---|---|---|---|---|---|---|---|---|
| | | | | | | | 1 | (4) |
| | | | | | | 2 | 1 | |
| | | | | 4 | 4 | 3 | 2 | |
| 9 | 9 | 9 | 8 | 7 | 6 | 5 | 5 | | which, if laid out in a line corresponding to the bit positions $M_0$ through $M_{14}$ for which they represent counts, provides:

$$9\ 9\ 9\ 8\ 7\ 6\ 5\ 5\ 4\ 4\ 3\ 2\ 2\ 1\ 1\ - \quad (5)$$

(where the dash "-" indicates that no count is provided for bit position $M_{15}$) which, in turn, comprise the shift values for the right shift series 30(n)(R) of the respective shift columns 30(n).

Expressing the counts in (3) in binary, to illustrate the binary-encoded values represented by the respective signals, where the least significant digit is at the top and the most significant at the bottom:

| | | | | | | | | | | | | | | | | |
|---|---|---|---|---|---|---|---|---|---|---|---|---|---|---|---|---|
| 1 | 2 | 2 | | 0 | | 1 | | 2 | | 1 | | 1 | | 2 | 1 | (1) |
| 2 | 2 | 2 | 2 | 3 | | 2 | | 2 | | 3 | | 4 | 4 | 3 | 2 | |
| 3 | 3 | 4 | 4 | 4 | 5 | 5 | 6 | 9 | 9 | 9 | 8 | 7 | 6 | 5 | 5 | |

| | | | | | | | | | | | | | | | | |
|---|---|---|---|---|---|---|---|---|---|---|---|---|---|---|---|---|
| — | 0 | 1 | 0 | 0 | 0 | 0 | 0 | 1 | 1 | 0 | 0 | 0 | 1 | 1 | 0 | (6) |
| — | — | 0 | 1 | 1 | 1 | 1 | 1 | 1 | 1 | 0 | 0 | 0 | 0 | 0 | 1 | |
| — | — | — | — | 0 | 0 | 0 | 0 | 0 | 0 | 1 | 1 | 1 | 1 | 1 | 1 | |
| — | — | — | — | — | — | — | — | 0 | 0 | 0 | 0 | 0 | 0 | 0 | 0 | | and shifting the rows of (6) by $-2^s$ to represent the binary values represented by the signals applied to the shift elements of the left shift series of the respective columns provides:

| | | | | | | | | | | | | | | | | |
|---|---|---|---|---|---|---|---|---|---|---|---|---|---|---|---|---|
| 0 | 1 | 0 | 0 | 0 | 0 | 0 | 1 | 1 | 0 | 0 | 0 | 1 | 1 | 0 | — | (7) |
| 0 | 1 | 1 | 1 | 1 | 1 | 1 | 1 | 0 | 0 | 0 | 0 | 0 | 1 | — | — | |
| 0 | 0 | 0 | 0 | 0 | 0 | 1 | 1 | 1 | 1 | 1 | 1 | — | — | — | — | |
| 0 | 0 | 0 | 0 | 0 | 0 | 0 | 0 | — | — | — | — | — | — | — | — | | which, in turn, represent the signals applied to the shift elements of the left shift series of the respective columns 30(n).

Similarly, expressing the counts in (5) in binary,

| | | | | | | | | | | | | | | | | |
|---|---|---|---|---|---|---|---|---|---|---|---|---|---|---|---|---|
| 1 | 1 | 1 | 0 | 1 | 0 | 1 | 1 | 0 | 0 | 1 | 0 | 0 | 1 | 1 | — | (8) |
| 0 | 0 | 0 | 0 | 1 | 1 | 0 | 0 | 0 | 0 | 1 | 1 | 1 | 0 | — | — | |
| 0 | 0 | 0 | 0 | 1 | 1 | 1 | 1 | 1 | 1 | 0 | 0 | — | — | — | — | |
| 1 | 1 | 1 | 1 | 0 | 0 | 0 | 0 | — | — | — | — | — | — | — | — | | and shifting the rows of (8) by $+2^s$ to represent the binary values represented by the signals applied to the shift elements of the right shift series of the respective columns provides:

| | | | | | | | | | | | | | | | | |
|---|---|---|---|---|---|---|---|---|---|---|---|---|---|---|---|---|
| — | 1 | 1 | 1 | 0 | 1 | 0 | 1 | 1 | 0 | 0 | 1 | 0 | 0 | 1 | 1 | (9) |
| — | — | 0 | 0 | 0 | 0 | 1 | 1 | 0 | 0 | 0 | 0 | 1 | 1 | 1 | 0 | |
| — | — | — | — | 0 | 0 | 0 | 0 | 1 | 1 | 1 | 1 | 1 | 1 | 0 | 0 | |
| — | — | — | — | — | — | — | — | 1 | 1 | 1 | 1 | 0 | 0 | 0 | 0 | | which, in turn, represent the signals applied to the shift elements of the left shift series of the respective columns 30(n).

As noted above, the values depicted in (7) represent the signals applied to the shift elements successive shift stages 34(s) of the respective columns 30(n) comprising the left shift series. The inputs to, and outputs from, those shift elements, using the values depicted in (7) to represent the signals, comprise:

Similarly, the inputs to, and outputs from, the right shift elements, using the values depicted in (9) to represent the signals, comprise:

| | | | | | | | | | | | | | | | | |
|---|---|---|---|---|---|---|---|---|---|---|---|---|---|---|---|---|
| a | b | c | d | e | f | g | h | i | j | k | l | m | n | o | p | (10) |
| a | c | c | d | e | f | g | i | j | j | k | l | n | o | o | p | |
| a | d | e | f | g | i | j | j | j | j | k | l | n | p | — | — | |
| a | d | e | f | g | i | k | l | n | p | — | — | — | — | — | — | |
| a | d | e | f | g | i | k | l | n | p | — | — | — | — | — | — | |

| — | b | c | d | e | f | g | h | i | j | k | l | m | n | o | p | (11) |
|---|---|---|---|---|---|---|---|---|---|---|---|---|---|---|---|---|
| — | — | b | c | e | e | g | g | h | j | k | k | m | n | n | o | |
| — | — | b | c | e | e | e | e | h | j | k | k | k | k | m | o | |
| — | — | b | c | e | e | e | e | e | e | e | e | h | j | m | o | |
| — | — | — | — | — | — | — | — | — | — | b | c | h | j | m | o | | and combining the last lines of (10) and (11) as provided by the OR gates 32(n) provides $$a\ d\ e\ f\ g\ i\ k\ l\ n\ p\ b\ c\ h\ j\ m\ o \qquad (12)$$

as expected.

Figure 2A:
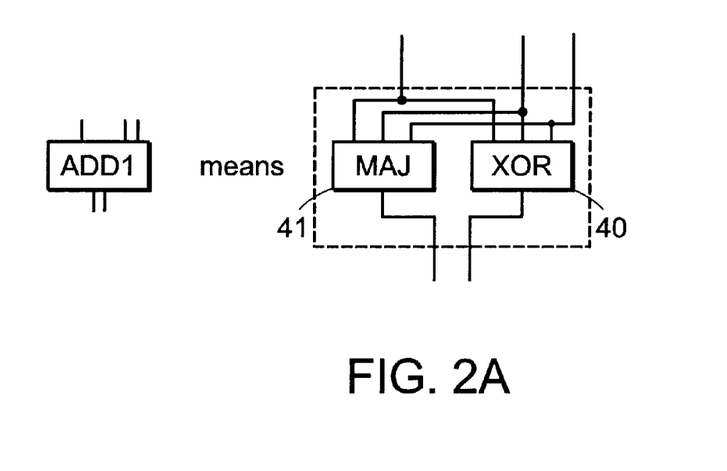
FIGS. 2A through 2D depict logical implementations of various circuit elements depicted in FIG. 1A.
Figure 2B:
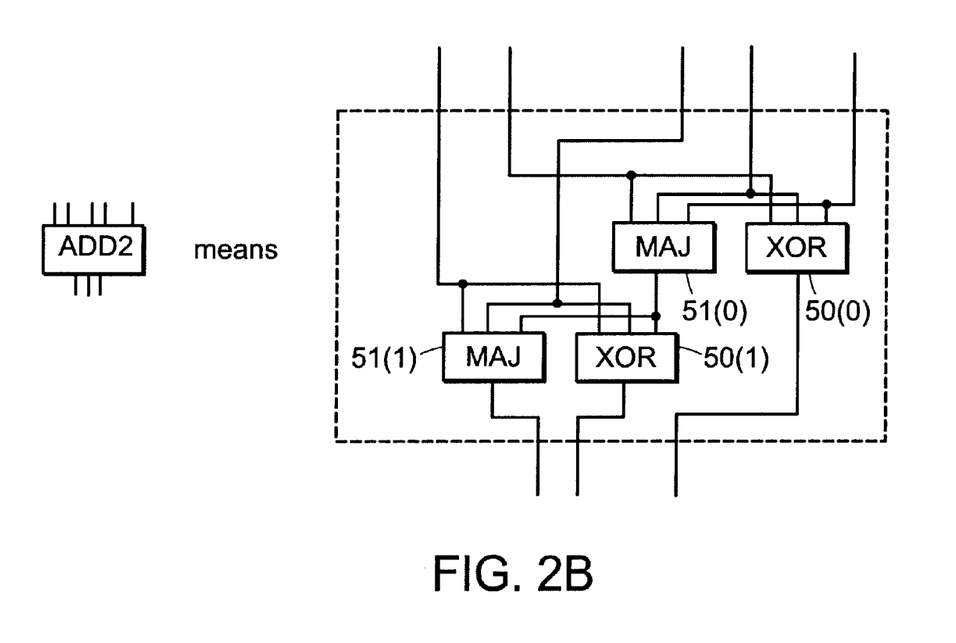
Figure 2C:
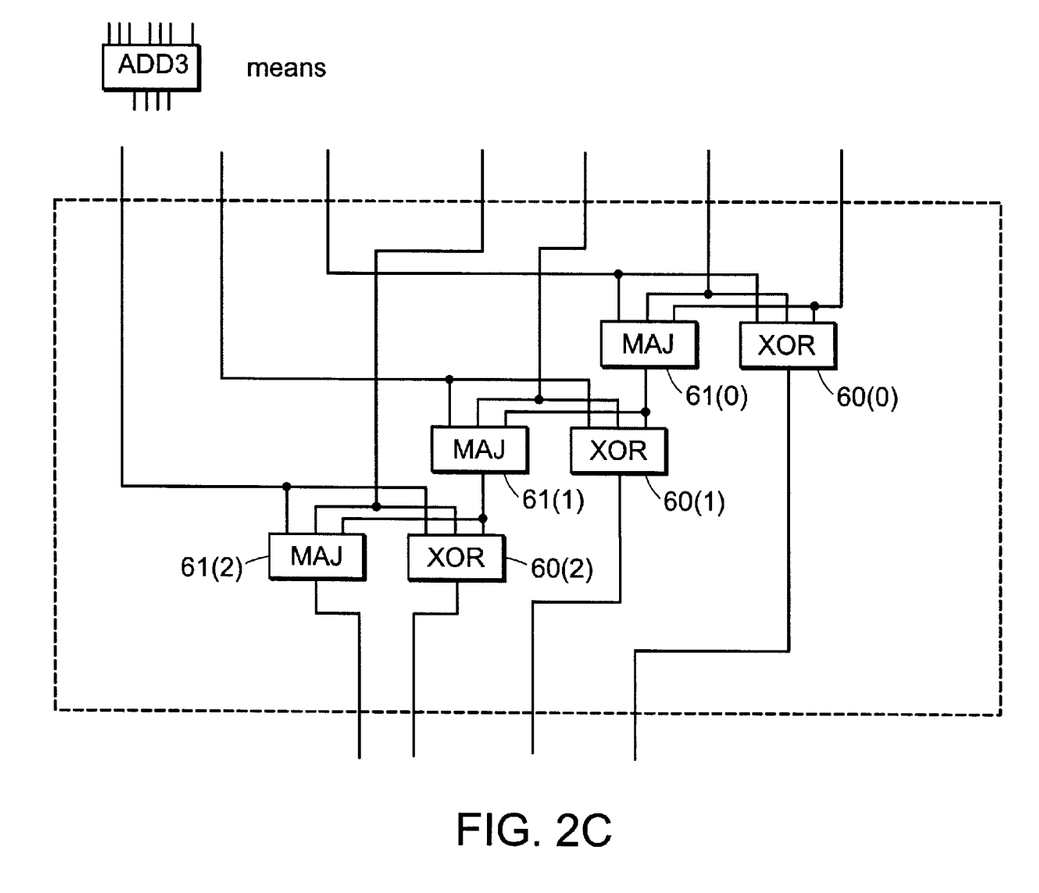

As noted above, FIG. 2, comprising FIGS. 2A through 2C, depict circuits for the adders A1-xx, A2-xx and A3-xx used in one embodiment of the invention. Each adder A1-xx receives three input signals, each representing a binary-encoded value, and generates two output signals representing a single binary-encoded value. As noted above, each input signal received by an adder A1-n represents a value indicating whether a mask bit $M_{n-1}$, $M_n$ or $M_{n+1}$ is set or clear, and the value generated by adder A1-n indicates the number of those mask bits which are set or clear. As shown in FIG. 2A, the adder A1-xx comprises an XOR gate 40 and a majority circuit 41. The XOR gate 40 generates an asserted signal, representing the value "one," if one or three of the input signals are asserted, and a negated signal, representing the value "zero," if zero or two of the input signals are asserted. The majority circuit 41 generates an asserted signal if two or three of the input signals are asserted, and a negated signal if zero or one of the input signals is asserted. It will be appreciated that the output signal generated by the majority circuit 41 represents the high-order digit in the two-digit value generated by the adder is A1-xx, and the output signal generated by the XOR gate represents the low-order digit in the two-digit value generated by the adders A1-xx.

Similarly, each adder A2-xx receives three inputs, each representing a binary-encoded value, and generates three output signals representing a single binary-encoded value. The three inputs comprise two two-bit binary encoded values and a one-bit binary encoded value. As shown in FIG. 2B, the adder A2-xx comprises two XOR gates 50(0) and 50(1) and two majority circuits 51(0) and 51(1). The XOR gate 50(0) and majority circuit 51(0) receive signals representing the low-order digits of the binary-encoded input values and generate, respectively, signals representing the low-order and high-order digits of the sum of those digits, in a manner similar to that described above in connection with FIG. 2A. In adder A2-xx, the output signal generated by the majority circuit 51(0) effectively represents a carry digit which is coupled to the XOR gate 50(1) and majority circuit 51(1). The XOR gate 50(1) and majority circuit 51(1) also receive signals representing the high-order digits of the two two-digit values and from those signals and the signal from majority circuit 51(0) representing the carry digit, generate signals representing respective low- and high-order digits in a manner similar to that described above in connection with FIG. 2A. Accordingly, the signal generated by XOR gate 50(0) represents the low-order digit in the value generated by adder A2-xx, the signal generated by XOR gate 50(1) represents the intermediate-order digit and the signal generated by majority circuit 51(1) represents the high-order digit.

In addition, each adder A3-xx receives three inputs, each representing a binary-encoded value, and generates four output signals representing a single binary-encoded value. The three inputs comprise two three-bit binary encoded values and a one-bit binary encoded value. As shown in FIG. 2C, the adder A3-xx comprises three XOR gates 60(0), 60(1) and 60(2) and three majority circuits 61(0), 61(1) and 61(2). The XOR gate 60(0) and majority circuit 61(0) receive signals representing the low-order digits of the binary-encoded input values and generate, respectively, signals representing the low-order and high-order digits of the sum of those digits, in a manner similar to that described above in connection with FIG. 2A. In adder A3-xx, the output signal generated by the majority circuit 61(0) effectively represents a carry digit which is coupled to the XOR gate 60(1) and majority circuit 61(1). The XOR gate 60(1) and majority circuit 61(1) also receive signals representing the intermediate-order digits of the two three-digit values and from those signals and the signal from majority circuit 61(0) representing the carry digit, generate signals representing respective low- and high-order digits in a manner similar to that described above in connection with FIG. 2A. The high-order digit from majority circuit 61(1) also represents a carry digit which is coupled to the XOR gate 60(2) and majority circuit 61(2), which also operate in a manner similar to that described above in connection with FIG. 2A to generate respective low- and high-order digits. Accordingly, the signal generated by XOR gate 60(0) represents the low-order digit in the value generated by adder A3-xx, the signal generated by XOR gate 60(1) represents the second-low-order digit, the signal generated by the XOR gate 60(2) represents the third-low-order (or second-high order) digit and the signal generated by majority circuit 61(2) represents the high-order digit of the four-digit value generated by adder A3-xx.

Figure 2D:
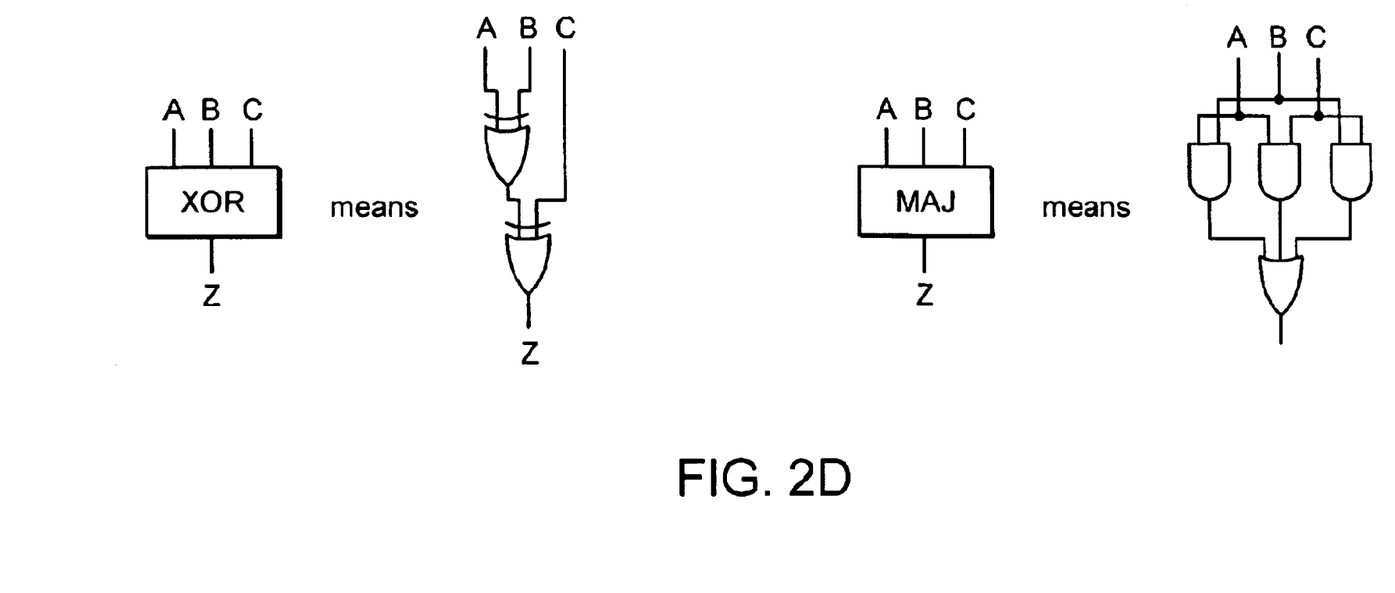

Illustrative logic circuits for the XOR and majority circuits are depicted in FIG. 2D. Their operation will be apparent to those skilled in the art and will not be described further herein.

The invention provides a number of advantages. In particular, the invention provides a functional unit for efficiently executing a "sheep and goats" instruction, in which bits $D_n$ of a data word are rearranged according to bits $M_n$ of a mask word, so that all bits $D_n$ of the data word are divided into two groups as defined by bits of a mask word, one group (the "sheep") corresponding to those bits for which the bits of the mask word are clear, and the other (the "goats") corresponding to those bits for which the bits are mask word are set, and in addition preserves order of the data bits in each group. In addition, the invention further provides a functional unit for efficiently executing a variant of the "sheep and goats" instruction, in which the bits of the rearranged data word in bit positions for which the bits of the mask are clear will be set to zero.

It will be appreciated that a number of modifications may be made to the functional unit described above in connection with FIGS. 1 and 2. For example, it will be apparent that the functional unit can readily be modified to operate so that the data bits associated with the mask bits which are set are shifted to the left and the data bits associated with the mask bits which are clear are shifted to the right by changing the group of adders whose inputs are complemented and having the inverter 20 provided for the $M_0$ mask bit instead of the $M_{15}$ mask bit. In addition, it will be appreciated that the mask bits $M_n$ for which the data bits are set to zero will comprise the mask bits $M_n$ which are set, by providing that the AND gates 35(n) are connected to control the shifting of the data bits into the right shift series 31(n) in each column 30(n).

Furthermore, although the invention has been described in connection with rearranging portions of a data word comprising single-bit units, each associated with a bit of the mask word, it will be apparent that the invention can be used in connection with rearranging multi-bit data word units, with each unit being associated with a bit of the mask word. In that case, each of the gates and multiplexers in the shift element 12 will receive, instead of a single bit, the corresponding multi-bit portion and provide as an output a corresponding multi-bit portion.

In addition, although the functional unit has been described as rearranging a sixteen bit data word $D_n$ according to the bits of a sixteen bit mask word $M_n$, it will be appreciated that the functional unit may be extended to rearrange a data word of any size. Generally, for a data word of size N, there will be provided an adder array and a shifter array. The adder array comprises adders arranged in an array comprising $(Log_2 N)-1$ layers, with each layer "j" having $(N/2)+2^j$ adders. Each adder accepts two j-bit binary numbers plus one one-bit number and generates therefrom a j+1 bit binary number. The adders are arranged in columns which correspond to the bit positions $M_n$ and $D_n$ of the mask and data word, respectively, and layer "j" has an adder in column "k" (k ranging from 0 to N−1) unless k is an odd number less than $N-2^j$ but not less than $2^j$. Generally, as "j" ranges from 1 through $Log_2 N$ and "k" ranges from 0 through N−1, the adder in layer "j" and column "k":

(i) for "k"<$2^j$ (that is, is an adder which generates a value used in controlling shifting to the left):
  (a) if "k" is odd, the inputs to the adder are
    (I) the output of the adder in layer floor $(Log_2 k)$ and column $k-2^{floor(log_2 k)}$ (where "floor" is a function that provides the greatest integer in its argument), padded to the left with "0" bits as necessary to make "j" bits,
    (II) the output of the adder in layer j−1, column $k+2^{j-1}-1$, and
    (III) mask bit $M_{k+2^{j-1}-1}$,
  (b) if "k" is even, the inputs to the adder are
    (I) the output of the adder in layer floor$(Log_2(k+1))$ and column $k+1-2^{floor(log_2(k+1))}$, padded to the left with "0" bits as necessary to make "j" bits,
    (II) the output of the adder in layer j−1, column $k+2^{j-1}$, and
    (III) a "0" bit,
(ii) for $2^j \leq$"k"<$N-2^j$ (that is, an adder which does not generate a value that controls shifting; note that adders in this group are provided only if "k" is even), the inputs to the adder are:
  (I) the output of the adder in layer j−1 and, column $k-2^{j-1}$,
  (II) the output of the adder in layer j−1 and column $k+2^{j-1}$, and
  (III) mask bit $M_k$,
(iii) for "k"$\geq N-2^j$ (that is, an adder which generates a value used in controlling shifting to the right)
  (a) if "k"=N−1
    (I) for "j"=1, the inputs to the adder are:
      (A) a "0" bit,
      (B) the complement of the mask bit $M_{N-1}$, and
      (C) the complement of the mask bit $M_{N-2}$,
    (II) otherwise (that is, "j">1), the inputs of the adder are:
      (A) zero (that is, "j" "0" bits),
      (B) the output of the adder in layer j−1 and column $N-2^{j-1}$, and
      (C) the inverse of the mask bit $M_{N-2^j}$,
  (b) if "k"=N−2, the inputs to the adder are:
    (I) the complements of the bits of the output of the adder in layer j−1 and column $N-2-2^{j-1}$,
    (II) the complement of the mask bit $M_{n-1}$, padded on the left with 0-bits as necessary to make "j" bits, and
    (III) the complement of the mask bit $M_{N-1}$, and
  (c) otherwise (that is, for k<N−2),
    (I) if "k" is odd, the inputs to the adder are:
      (A) the complements of the bits of the output of the adder in layer j−1 and column $k+1-2^{j-1}$
      (B) the output of the adder in layer floor $(Log_2(N-1-k))$ and column $k+2^{floor(log_2(N-1-k))}$, padded on the left with "0" bits as necessary to make "j" bits, and
      (C) the complement of the mask bit $M_{k+1-2^j}$, and
    (II) otherwise (that is, if "k" is even), the inputs to the adder are:
      (A) the complements of the bits of the output of the adder in layer j−1 and column $k-2^{j-1}$,
      (B) the output of the adder in layer floor$(Log_2(N-1-k))$ and column $k+2^{floor(log_2(N-1-k))}$, padded on the left with "0" bits as necessary to make "j" bits, and
      (C) the complement of the mask bit $M_k$, where the mask bits $M_n$ are considered the outputs of adders in a zeroth layer of the adder array. The outputs of the adders in groups (i) and (iii) above are labeled with names of the form X[j][k] and Y[j][k], respectively. Generally, for k<$N-2^j$ (the outputs of the adders in group (i)), X[i][k] names bit "j−1" of the output of the adder in layer floor $(k+2^j)$ and column $k+2^j-2^{floor(k+2^j)}$. For $2^j \leq k$, and either j>1 or k<N−1, Y[j][k] names bit j−1 of the output of the adder in layer floor $(N-1-k+2^j)$ and column $k-2^j+2^{floor(N-1-k+2^j)}$. As a special case, Y[1][N−1] corresponds to the complement of the mask bit $M_{N-1}$.

The shift array comprises au input zeroth shift stage, an array of shifter gates and an output stage. The shifter gate array comprises an array of shifter gates organized in $Log_2 N$ shift stages and "k" columns, with each shifter gate comprising both a left shift element and a right shift element. The zeroth shift stage is provided ahead of the shifter gate array to control the gating of the respective data bits to the left shift elements of their respective columns of the shifter gate array. In the zeroth shift stage, "k" columns of input shift elements are provided, which, for columns k=1, . . . ,N−2, couple the k-th data bit $D_k$ to the input of the left shift element in the k-th column of the first shift stage of the shifter gate array if the BOTH signal is asserted; otherwise, the BOTH signal enables a zero to be gated to the input of the left shift element in the k-th column of the first shift stage. In the rightmost column k=N−1 the input shift element is controlled by both the BOTH signal and the complement of the rightmost $M_{N-1}$st bit of the mask word and shifts the $D_{N-1}$st data bit to the input of the left shift element in the N−1st column if both the BOTH signal and a signal representative of the complement of the $M_{N-1}$st bit of the mask word are asserted, and otherwise a zero will be gated to the input of that left shift element. The zeroth shift stage further includes an input shift element in the leftmost k=0 column which couples the $D_0$ data bit to the input of the right shift element of that column if a signal representative of the leftmost $M_0$ bit of the mask word is asserted, and otherwise a zero will be gated to the input of that right shift element. It will be appreciated that the zeroth shift layer can be implemented as a series of AND gates.

In the shifter gate array:

(i) for column "k"<$2^{j-1}$ ("j" identifying the shift stage in the shifter gate array)
  (a) the left shift element in shift stage "j" of column "k" is a multiplexer that is controlled by signal X[j][k] from the adder array such that
    (I) if the X[j][k] signal is asserted (which will be the case if the binary digit generated by the adder array therefor is a "one" digit), the output is the same as the output of the left shift element in shift stage j−1 and column k+$2^{j-1}$, thereby to effect a left shift into the "k"-th column, but
    (II) if the X[j][k] signal is negated (which will be the case if the binary digit generated by the adder array therefor is a "zero" digit), the output is the same as the output of the left shift element in shift stage j−1 and column k;
  (b) the right shift element in shift stage "j" of column "k" is an AND NOT gate which has one complementing input which is controlled by signal Y[j][$2^{j-1}$] and a non-complementing input which is the output of the right shift element in layer j−1 and column k;

(ii) for column $2^{j-1} \leq k < N - 2^{j-1}$
  (a) the left shift element in shift stage "j" of column "k" is a multiplexer that is controlled by signal X[j][k] from the adder array such that
    (I) if the X[j][k] signal is asserted (which will be the case if the binary digit generated by the adder array therefor is a "one" digit), the output is the same as the output of the left shift element in shift stage j−1 and column k+$2^{j-1}$, thereby to effect a left shift into the "k"-th column, but
    (II) if the X[j][k] signal is negated (which will be the case if the binary digit generated by the adder array therefor is a "zero" digit), the output is the same as the output of the left shift element in shift stage j−1 and column k;
  (b) the right shift element in shift stage "j" of column "k" is a multiplexer that is controlled by signal Y[j][k] from the adder array such that
    (I) if the Y[j][k] signal is asserted (which will be the case if the binary digit generated by the adder array therefor is a "one" digit), the output is the same as the output of the right shift element in shift stage j−1 and column k−$2^{j-1}$, thereby to effect a right shift into the "k"-th column, but
    (II) if the Y[j][k] signal is negated (which will be the case if the binary digit generated by the adder array therefor is a "zero" digit), the output is the same as the output of the right shift element in shift stage j−1 and column k;

(iii) for column $N - 2^{j-1} \leq k$ ("j" identifying the shift stage in the shifter gate array)
  (a) the left shift element in shift stage "j" of column "k" is an AND NOT gate which has one complementing input which is controlled by signal X[j][N−1−$2^{j-1}$] and a non-complementing input which is the output of the left shifter element in layer j−1 and column k;
  (b) the right shift element in shift stage "j" of column "k" is a multiplexer that is controlled by signal Y[j][k] from the adder array such that
    (I) if the Y[j][k] signal is asserted (which will be the case if the binary digit generated by the adder array therefor is a "one" digit), the output is the same as the output of the left shift element in shift stage j−1 and column k−$2^{j-1}$, thereby to effect a right shift into the "k"-th column, but
    (II) if the Y[j][k] signal is negated (which will be the case if the binary digit generated by the adder array therefor is a "zero" digit), the output is the same as the output of the right shift element in shift stage j−1 and column k;

where the "left shift element" for shift stage 0 comprises the input shift elements that are controlled by the BOTH signal.

The output stage receives, for each column "k" the outputs of the left and right shift elements of the respective k-th column as inputs and provides an output corresponding to the OR of those inputs. The output stage can be implemented as an array of "N" OR gates.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

What is claimed is:

1. For producing from input signals representing an input data word and a mask word an output signal representing an output data word, the input and output data words comprising N data units $D_n$, and $Z_n$, respectively, where n=0, 1, 2, . . . , N−1, the mask word comprising, for each data unit $D_n$ in the input word and thereby for the corresponding data unit $Z_n$ in the output word, a separate mask bit $M_n$ associated therewith that assumes one of a right-indicating value and a left-indicating value, a centrifuge circuit comprising a control module configured to generate, for each mask bit $M_n$ such that n<N−1, a right-sum output representing the number $R_n$ of mask bits $M_k$ such that k>n that have the left-indicating value and further comprising a shifter module, responsive to the mask word and the right-sum outputs, to provide, for each n such that mask bit $M_n$ that has the right-indicating value, the input word's data unit $D_n$ as the output word's data unit $Z_d$, where d=n+$R_n$, wherein:

A) the shifter module comprises, for each data unit $Z_n$ in the output data word, a respective shift column $C_n$ associated therewith and thereby with the respective mask bit $M_n$ and the respective data unit $D_n$ in the input data word, each shift column $C_n$ generating the respective data unit $Z_n$ and including a right series of J shift elements $S_j$, where $1 \leq j \leq J$, each shift element $S_j$ being connected to receive a respective pass input, providing a respective shift-element output, and being associated with a respective shift value $s_j$ such that, for $$j < J, s_{j+1} > \sum_{k=1}^{J} s_k;$$

B) in the right series of each shift column $C_n$:
  i) shift element $S_1$ receives $D_n$ as its pass input if mask bit $M_n$ has the right-indicating value;
  ii) each other shift element $S_j$ receives as its pass input the output of shift element $S_{j-1}$ in the same series;
C) in the right series of each shift column $C_n$ of at least a plurality of the shift columns, each shift element $S_j$ of a plurality of the shift elements includes a multiplexer that:
  i) receives as its shift input:
    a) if $j=1$, the input word's data unit $D_d$ if mask bit $M_d$ has the right-indicating value, where $d=n-s_j$; and
    b) if $j>1$, the shift-element output of the shift element $S_{j-1}$ in the right series of column $C_d$, where $d=n-s_j$;
  ii) makes a choice between its inputs in accordance with the value of $R_d$, where $d=n-s_j$; and
  iii) forwards its input thus chosen as shift element $S_j$'s output;
D) for each n, the sum of the shift values $s_j$ associated with the multiplexers that choose their shift inputs in response to $R_n$ is $R_n$; and
E) for each n such that $n \geq N-R_T$, where $R_T$ is the total number of bits in the mask word having the right-indicating value, the shift module provides as $Z_n$ the output of the shift module $S_J$ in the right series of shift column $C_n$.

2. A centrifuge circuit as defined in claim 1 wherein, in the right series of each shift column $C_n$ each shift element $S_j$ either comprises one of said multiplexers or a gate element that forwards $S_j$'s pass input as its output when a gating signal applied thereto has a gate-enabling value.

3. A centrifuge circuit as defined in claim 2 wherein $s_j = 2^{j-1}$.

4. A centrifuge circuit as defined in claim 2 wherein:
  A) each of the right-sum outputs representing a number $R_n$ of mask bits comprises a sum bit $b_j$ for at least each non-negative integer j such that $j \leq K$, where K is the smallest integer such that $$N - n - 1 \leq \sum_{j=1}^{K} s_j;$$

B) the values of the bits by representing a given value $R_n$ are such that $$R_n = \sum_{j=1}^{J} b_j s_j;$$

and
  C) each multiplexer in a shift element $S_j$ in the right series of shift elements in shift column $C_n$ bases the choice between its inputs only on the sum bit $b_j$ in the right-sum output representing $R_d$, where $d=n-s_j$.

5. A centrifuge circuit as defined in claim 2 wherein, in the right series of shift elements in shift column $C_n$, each shift element $S_j$ such that $n \geq s_j$ comprises one of the multiplexers.

6. A centrifuge circuit as defined in claim 5 wherein, in the right series of shift elements in shift column $C_n$, each shift element $S_j$ such that $n < s_j$ comprises one of the gate elements.

7. A centrifuge circuit as defined in claim 6 wherein, in the right series of shift elements in shift column $C_n$, the gating signal applied to each shift element $S_j$ such that $n < s_j$ is the respective sum bit $b_j$ of $R_0$, to which that shift element $S_j$ responds by producing as the output of $S_j$ a predetermined common data-unit value when that sum bit is a one and by forwarding $S_j$'s pass input as $S_j$'s shift-element output when that sum bit is a zero.

8. A centrifuge circuit as defined in claim 7 further including a right-series input gate, which responds to input data unit $D_0$ and mask bit $M_0$ by producing as the pass input of shift element $S_1$ in column $C_0$'s right series an output whose value is:
  A) a predetermined, disabled-state value when mask bit $M_0$ has the left-indicating value; and
  B) $D_0$ when mask bit $M_0$ has the right-indicating value.

9. A centrifuge circuit as defined in claim 1 wherein, in at least a first mode of operation thereof:
  A) the control module is additionally configured to generate, for each mask bit $M_n$ such that $n>0$, a left-sum output representing the number $L_n$ of mask bits $M_k$ such that $k<n$ that have the right-indicating value; and
  B) the shifter module is responsive to the input data word and the left-sum outputs to provide, for each n such that mask bit $M_n$ that has the left-indicating value, data unit $D_n$ as data unit $Z_d$, where $d=n-L_n$.

10. A centrifuge circuit as defined in claim 9 wherein the centrifuge circuit is also operable in a second mode of operation, in which the shift module provides, for each n such that mask bit $M_n$ that has the left-indicating value, a predetermined common data-unit value as $Z_d$, where $d=n-L_n$.

11. A centrifuge circuit as defined in claim 9 wherein each shift column $C_n$ additionally includes a left series of J shift elements $S_j$, where $1 \leq j \leq J$, each shift element $S_j$ in that shift column's left series being connected to receive a respective pass input, providing a respective shift-element output, and being associated with a respective shift value $s_j$ such that, for $$j < J, s_{j+1} > \sum_{k=1}^{J} s_k,$$

wherein:
  A) in at least the first mode of operation, shift element $S_1$ in shift column $C_n$'s left series receives $D_n$ as its pass input if mask bit $M_n$ has the left-indicating value;
  B) each other shift element $S_j$ in shift column $C_n$'s left series receives, as its pass input, the output of shift element $S_{j-1}$ in the same series;
  C) in the left series each shift column $C_n$ of at least a plurality of the shift columns, each of a plurality of the shift elements includes a multiplexer that:
    i) receives as its shift input:
      a) in at least the first mode of operation, if $j=1$, the input word's data unit $D_d$ if mask bit $M_n$ has the left-indicating value, where $d=n+s_j$; and
      b) if $j>1$, the shift-element output of the shift element $S_{j-1}$ in the left series of column $C_d$, where $d=n+s_j$;
    ii) makes a choice between its inputs in accordance with the value of $L_d$, where $d=n+s_j$; and iii) forwards its input thus chosen as $S_j$'s output; and D) for each n, the sum of the shift values $s_j$ associated with the multiplexers that choose their shift inputs in response to $L_n$ is $L_n$;

E) for each n such that $n<N-R_T$, where $R_T$ is the total number of bits in the mask word having the right-indicating value, the shift module provides as $Z_n$ the output of the shift module $S_J$ in the left series of shift column $C_n$.

12. A centrifuge circuit as defined in claim 11 wherein:

A) in the right series of each shift column $C_n$ each shift element $S_j$ either comprises one of said multiplexers or a gate element that forwards $S_j$'s pass input as $S_j$'s output when a gating signal applied thereto has a gate-enabling value; and B) in the left series of each shift column $C_n$ each shift element $S_j$ either comprises one of said multiplexers or a gate element that forwards $S_j$'s pass input as $S_j$'s output when a gating signal applied thereto has a gate-enabling value.

13. A centrifuge circuit as defined in claim 12 wherein:

A) each of the right-sum outputs representing a number $R_n$ of mask bits comprises a sum bit $b_j$ for at least each non-negative integer j such that $j \leq K$, where K is the smallest integer such that $$N - n - 1 \leq \sum_{j=1}^{K} s_j;$$

B) the values of the bits $b_j$ representing a given value $R_n$ are such that $$R_n = \sum_{j=1}^{J} b_j s_j;$$

C) each multiplexer in a shift element $S_j$ in the right series of shift elements in shift column $C_n$ bases the choice between its inputs only on the sum bit $b_j$ in the right-sum output representing $R_d$, where $d = n - s_j$;

D) each of the left-sum outputs representing a number $L_n$ of mask bits comprises a sum bit $b_j$ for at least each non-negative integer j such that $j \leq K$, where K is the smallest integer such that $$n \leq \sum_{j=1}^{K} s_j;$$

E) the values of the bits $b_j$ representing a given value $L_n$ are such that $$L_n = \sum_{j=1}^{J} b_j s_j;$$

and

F) each multiplexer in a shift element $S_j$ in the left series of shift elements in shift column $C_n$ bases the choice between its inputs only on the sum bit $b_j$ in the left-sum output representing $L_d$, where $d = n + s_j$.

14. A centrifuge circuit as defined in claim 13 wherein $s_j = 2^{j-1}$.

15. A centrifuge circuit as defined in claim 14 wherein:

A) in the left series of shift elements in shift column $C_n$, each shift element $S_j$ such that $n < N - s_j$ comprises one of the multiplexers; and B) in the right series of shift elements in shift column $C_n$, each shift element $S_j$ such that $n < s_j$ comprises one of the gate elements.

16. A centrifuge circuit as defined in claim 15 wherein:

A) in the right series of shift elements in shift column $C_n$, each shift element $S_j$ such that $n < s_j$ comprises one of the gate elements; and B) in the left series of shift elements in shift column $C_n$, each shift element $S_j$ such that $n \geq N - s_j$ comprises one of the gate elements.

17. A centrifuge circuit as defined in claim 16 wherein:

A) in the right series of shift elements in shift column $C_n$, the gating signal applied to each shift element $S_j$ such that $n < s_j$ represents the respective sum bit $b_j$ of $R_0$, to which that shift element $S_j$ responds by producing as the output of $S_j$ a predetermined common data-unit value when that sum bit is a one and by forwarding $S_j$'s pass input as $S_j$'s shift-element output when that sum bit is a zero; and B) in the left series of shift elements in shift column $C_n$, the gating signal applied to each shift element $S_j$ such that $n \geq N - s_j$ represents the respective sum bit $b_j$ of $L_{N-1}$, to which that shift element $S_j$ responds by producing as the output of $S_j$ a predetermined common data-unit value when that sum bit is a one and by forwarding $S_j$'s pass input as $S_j$'s shift-element output when that sum bit is a zero.

18. A centrifuge circuit as defined in claim 17 further including:

A) a right-series input gate, which responds to input data unit $D_0$ and mask bit $M_0$ by producing as the pass input of shift element $S_1$ in column $C_0$'s right series an output whose value is:
   i) a predetermined, disabled-state value when mask bit $M_0$ has the left-indicating value; and
   ii) $D_0$ when mask bit $M_0$ has the right-indicating value; and B) a left-series input gate, which responds to input data unit $D_{N-1}$ and mask bit $M_{N-1}$ by producing as the pass input of shift element $S_1$ in column $C_{N-1}$'s left series an output whose value is:
   i) a predetermined, disabled-state value when mask bit $M_{N-1}$ has the right-indicating value; and
   ii) $D_{N-1}$ when mask bit $M_{N-1}$ has the left-indicating value.

19. A centrifuge circuit as defined in claim 18 wherein:

A) the common data-unit value produced by each said shift element when the gating signal applied thereto is a one is zero;

B) the disabled-state value produced by the right- and left-series input gates is zero; and C) the shift module includes, for each said shift column $C_n$, a respective OR gate, whose output is $Z_n$ and whose inputs are the shift-element outputs of shift elements $S_J$ in shift column $C_n$'s right and left series of shift elements.

20. A centrifuge circuit as defined in claim 11 wherein:

A) the centrifuge circuit further comprises an input stage that is operable in first and second modes of operation;

B) in the first mode of operation, the input stage applies the input data word's data units $D_n$ to respective shift columns $C_n$ as the pass inputs of the shift elements $S_1$ in the left series thereof; and C) in the second mode of operation, the input stage applies a common data-unit value to all of the shift columns $C_n$ as the pass inputs of the shift elements $S_1$ in the left series thereof.

21. A centrifuge circuit as defined in claim 1 wherein each of the data units is a single bit.

22. For producing an output data word comprising data units $Z_n$ by rearranging data units $D_n$ of an input data word, where n=1, 2, . . . , N−1 and $D_n$ and $Z_n$ are respectively considered to be to the left of $D_{n+1}$ and $Z_{n+1}$, in accordance with a mask word, the mask word including N mask bits $M_n$, each mask bit $M_n$ being associated with respective data unit $D_n$, and having a respective one of two possible mask-bit values, namely, a left-indicating mask-bit value and a right-indicating mask-bit value, a data-unit-rearrangement circuit comprising:

A) a control module configured to generate, for at least each mask bit $M_n$ other than mask bit $M_{N-1}$, a right-sum output representing the number $R_n$ of mask bits to the right of the respective mask bit that have the left-indicating mask-bit value, wherein:

i) the control module includes an array of adders that are organized in a series of layers and generate the right-sum outputs associated with at least a plurality of the mask bits;

ii) each of at least a plurality of the adders in the first layer of the series of layers receives a respective series of consecutive ones of the mask bits as its adder inputs and generates therefrom a respective adder output identifying the number of the mask bits in that series of mask bits that have the left-indicating value; and iii) each adder in each subsequent layer receives as at least one of its adder inputs the adder output generated by an adder in the previous layer, and each of at least a plurality of the adders in each subsequent layer generates therefrom a respective adder output identifying the number of mask bits in a respective series of consecutive ones of the mask bits that have the left-indicating value, the length of the series of mask bits associated with each such adder being greater than that associated with any adder from which it draws one of its inputs; and B) a shifter module configured to shift data units of the input data word in accordance with the right-sum outputs.

23. A data-unit-rearrangement circuit as defined in claim 22 wherein the shifter module is responsive to the input data word and the right-sum outputs to provide, for each n such that mask bit $M_n$ that has the right-indicating value, data unit $D_n$ as data unit $Z_d$, where $d=n+R_n$.

24. A data-unit-rearrangement circuit as defined in claim 22 wherein the adder output of each of some of the adders is the adder input of more than one of the other adders.

25. A data-unit-rearrangement circuit as defined in claim 24 in which the number of layers is $(\log_2 N)-1$.

26. A data-unit-rearrangement circuit as defined in claim 24 wherein, if each mask $M_k$ is considered to be associated with an adder-array column k and each of the adders is considered to belong to one of the adder-array columns, then:

A) layer j includes an adder belonging to column k for each even $k \geq 2^j$ and each odd $k \geq N-2^j$;

B) the inputs to the adder in layer j and column k for $2^j \leq k < N-2^j$ are:

i) the output of the adder in layer j−1 and column $k-2^{j-1}$, ii) the output of the adder in layer j−1 and column $k+2^{j-1}$, and iii) mask bit $M_k$, where the mask bits $M_n$ are considered the outputs of adders in a zeroth layer of the adder array.

27. A data-unit-rearrangement circuit as defined in claim 26 wherein, for each adder in layer j and column k for $k \geq N-2^j$:

A) if k−N−1:

i) for j=1, the inputs to the adder are:
a) a zero bit;
b) the complement of the mask bit $M_{N-1}$, and
c) the complement of the mask bit $M_{N-2}$, and ii) if j>1, the inputs of the adder are:
a) zero;
b) the output of the adder in layer j−1 and column $N-2^{j-1}$, and
c) the complement of mask bit $M_{N-2^j}$;

B) if k=N−2, the inputs to the adder are:

i) the complements of the bits of the output of the adder in layer j−1 and column $N-2-2^{j-1}$;

ii) the complement of the mask bit $M_{N-1}$; and iii) the complement of the mask bit $M_{N-2}$, and C) if k<N−2:

i) if k is odd, the inputs to the adder are:
a) the complements of the bits of the output of the adder in layer j−1 and column $k+1-2^{j-1}$;
b) the output of the adder in layer floor$(\log_2(N-1-k))$ and column $k+2^{floor(\log_2(N-1-k))}$; and
c) the complement of mask bit $M_{k-1-2^j}$, and ii) if k is even, the inputs to the adder are:
a) the complements of the bits of the output of the adder in layer j−1 and column $k-2^{j-1}$,
b) the output of the adder in layer floor$(\log_2(N-1-k))$ and column $k+2^{floor(\log_2(N-1-k))}$, and
c) the complement of mask bit $M_k$, where the mask bits $M_n$ are considered the outputs of adders in a zeroth layer of the adder array.

28. A data-unit-rearrangement circuit as defined in claim 26 wherein:

A) for j>1, each adder in layer j such that j>1 is a three-input adder that includes two j-bit input ports and a single-bit port, at which it receives its inputs; and B) if one of the $j_1$-bit input ports of a given adder in layer $j_1$ receives as its input the output of an adder in layer j' such that j−j'>1, where the mask bits $M_n$ are considered the outputs of adders in a zeroth layer of the adder array, each of the j−j'−1 most-significant bits of that j-bit input port is a zero bit.

29. A data-unit-rearrangement circuit as defined in claim 26 in which the number of layers is $(\log_2 N)-1$.

30. A data-unit-rearrangement circuit as defined in claim 22 wherein:

A) the control module is additionally configured to generate, for at least each mask bit $M_n$ other than mask bit $M_0$, a left-sum output representing the number $L_n$ of mask bits to the right of the respective mask bit that have the right-indicating mask-bit value;

B) the adders generate the left-sum outputs associated with at least a plurality of the mask bits;

C) each of at least a plurality of the adders in the first layer of the series of layers receives a respective series of the mask bits as its adder inputs and generates therefrom a respective adder output identifying the number of that series of mask bits that have the left-indicating value; and D) each adder in each subsequent layer receives as at least one of its adder inputs the adder output generated by at least one of the adders in at least one previous layer, and each of at least a plurality of the adders in each subsequent layer generates therefrom a respective adder output identifying the number of mask bits in a respective series thereof that have the right-indicating value, the length of the series of mask bits associated with each such adder being greater than that associated with any adder from which it draws one of its inputs.

31. A data-unit-rearrangement circuit as defined in claim 30 wherein the adder output of each of some of the adders is the adder input of more than one of the other adders.

32. A data-unit-rearrangement circuit as defined in claim 31 in which the number of layers is $(\log_2 N)-1$.

33. A data-unit-rearrangement circuit as defined in claim 31 wherein some of the adders that receive mask bits as their adder inputs receive those mask bits complemented.

34. A data-unit-rearrangement circuit as defined in claim 31 wherein some of the adders that receive other adders' adder outputs as their adder inputs receive those adder outputs complemented.

35. A data-unit-rearrangement circuit as defined in claim 31 wherein, if each mask $M_k$ is considered to be associated with an adder-array column k and each of the adders is considered to belong to one of the adder-array columns, then:
  A) layer j includes an adder belonging to column k for each even $k \geq 2^j$ and each odd $k \geq N-2^j$;
  B) the inputs to the adder in layer j and column k for $2^j \leq k < N-2^j$ are:
    i) the output of the adder in layer j−1 and column $k-2^{j-1}$,
    ii) the output of the adder in layer j−1 and column $k+2^{j-1}$, and
    iii) mask bit $M_k$,
where the mask bits $M_n$ are considered the outputs of adders in a zeroth layer of the adder array.

36. A data-unit-rearrangement circuit as defined in claim 35 wherein, if each mask $M_k$ is considered to be associated with an adder-array column k and each of the adders is considered to belong to one of the adder-array columns, then:
  A) layer j includes an adder belonging to column k for each even k, each odd $k<2^j$, and each odd $k \geq N-2^j$;
  B) for each adder in layer j and column k, for $k<2^j$:
    i) if k is odd, the inputs to the adder are:
      a) the output of the adder in layer $\text{floor}(\log_2 k)$ and column $k-2^{\text{floor}(\log_2 k)}$, where "floor" is a function that provides the greatest integer less than or equal to its argument;
      b) the output of the adder in layer j−1, column $k+2^{j-1}-1$, and
      c) the mask bit $M_{k+2^j-1}$; and
    ii) if k is even, the inputs to the adder are:
      a) the output of the adder in layer $\text{floor}(\log_2(k+1))$ and column $k+1-2^{\text{floor}[\log_2(k+1)]}$;
      b) the output of the adder in layer j−1, column $k+2^{j-1}$, and
      c) zero,
where the mask bits $M_n$ are considered the outputs of adders in a zeroth layer of the adder array;
  C) for each adder in layer j and column k, for $k \geq N-2^j$:
    i) if k=N−1:
      a) for j=1, the inputs to the adder are:
        (1) a zero bit;
        (2) the complement of the mask bit $M_{N-1}$, and
        (3) the complement of the mask bit $M_{N-2}$, and
      b) if j>1, the inputs of the adder are:
        (1) zero;
        (2) the output of the adder in layer j−1 and column $N-2^{j-1}$, and
        (3) the complement of mask bit $M_{N-2^j}$;
    ii) if k=N−2, the inputs to the adder are:
      a) the complements of the bits of the output of the adder in layer j−1 and column $N-2-2^{j-1}$;
      b) the complement of the mask bit $M_{N-1}$; and
      c) the complement of the mask bit $M_{N-2}$, and
    iii) if k<N−2:
      a) if k is odd, the inputs to the adder are:
        (1) the complements of the bits of the output of the adder in layer j−1 and column $k+1-2^{j-1}$;
        (2) the output of the adder in layer floor $(\log_2(N-1-k))$ and column $k+2^{\text{floor}(\log_2(N-1-k))}$; and
        (3) the complement of mask bit $M_{k+1-2^j}$, and
      b) if k is even, the inputs to the adder are:
        (1) the complements of the bits of the output of the adder in layer j−1 and column $k-2^{j-1}$,
        (2) the output of the adder in layer floor $(\log_2(N-1-k))$ and column $k+2^{\text{floor}(\log_2(N-1-k))}$, and
        (3) the complement of mask bit $M_k$,
where the mask bits $M_n$ are considered the outputs of adders in a zeroth layer of the adder array.

37. A data-unit-rearrangement circuit as defined in claim 35 wherein:
  A) for j>1, each adder in layer j such that j>1 is a three-input adder that includes two j-bit input ports and a single-bit port, at which it receives its inputs; and
  B) if one of the $j_1$-bit input ports of a given adder in layer $j_1$ receives as its input the output of an adder in layer j' such that j−j'>1, where the mask bits $M_n$ are considered the outputs of adders in a zeroth layer of the adder array, each of the j−j'−1 most-significant bits of that j-bit input port is a zero bit.

38. A data-unit-rearrangement circuit as defined in claim 35 in which the number of layers is $(\log_2 N)-1$.

39. A data-unit-rearrangement circuit as defined in claim 31 wherein a first of the adders receives as an input a given other adder's output complemented and a second of the adders receives as an input the given adder's output uncomplemented.

40. A data-unit-rearrangement circuit as defined in claim 30 wherein the shifter module is responsive to the input data word and the right- and left-sum outputs to provide:
  A) for each n such that mask bit $M_n$ that has the right-indicating value, data unit $D_n$ as data unit $Z_d$, where $d=n+R_n$;
  B) for each n such that mask bit $M_n$ that has the left-indicating value, data unit $D_n$ as data unit $Z_d$, where $d=n-L_n$.

41. A data-unit-rearrangement circuit as defined in claim 30 wherein:
  A) each of a plurality of the adders in layers after the first is a three-input adder, which includes three input ports at which it receives its inputs; and
  B) one of those three input ports is a single-bit input port.

42. A data-unit-rearrangement circuit as defined in claim 22 wherein each of the data units is a single bit.

43. A data-unit-rearrangement circuit as defined in claim 22 wherein:
  A) each of a plurality of the adders in layers after the first is a three-input adder, which includes three input ports at which it receives its inputs; and
  B) one of those three input ports is a single-bit input port.

* * * * *